United States Patent [19]

Ishii et al.

[11] Patent Number: 5,105,402
[45] Date of Patent: Apr. 14, 1992

[54] DISC PLAYER WITH MANUAL SEARCH FUNCTION

[75] Inventors: Hidehiro Ishii; Noriyoshi Takeya; Chiharu Miura; Tatsuya Fukuda, all of Tokorozawa, Japan

[73] Assignee: Pioneer Electronic Corporation, Tokyo, Japan

[21] Appl. No.: 408,242

[22] Filed: Sep. 18, 1989

[30] Foreign Application Priority Data

Oct. 5, 1988 [JP] Japan .................. 63-251229

[51] Int. Cl.⁵ .................................. G11B 7/00
[52] U.S. Cl. ............................... 369/43; 369/32; 369/50; 369/33
[58] Field of Search ............ 369/43, 32, 48, 49, 369/54, 124, 50, 58, 59, 6, 33; 360/19.1, 67, 38.1; 358/907, 31

[56] References Cited

U.S. PATENT DOCUMENTS 4,592,036  5/1986  Furuya et al. .................. 369/32
4,831,466  5/1989  Murakami et al. ............... 360/67

Primary Examiner—Roy N. Envall, Jr.
Assistant Examiner—Robert Chevalier
Attorney, Agent, or Firm—Foley & Lardner

[57] ABSTRACT

A disc player operates in a manual search mode in which play and jump operations are alternately repeated, in response to a manual search command, while maintaining the reproducing level at a level lower than the level at the initiation of the manual search command as long as no change command appears.

When the change command appears the reproducing level is shifted to a level which is designated by an operator so as to adjust the reproduced sound level to a level sufficient to listen to the reproduced sound for music selection.

5 Claims, 3 Drawing Sheets

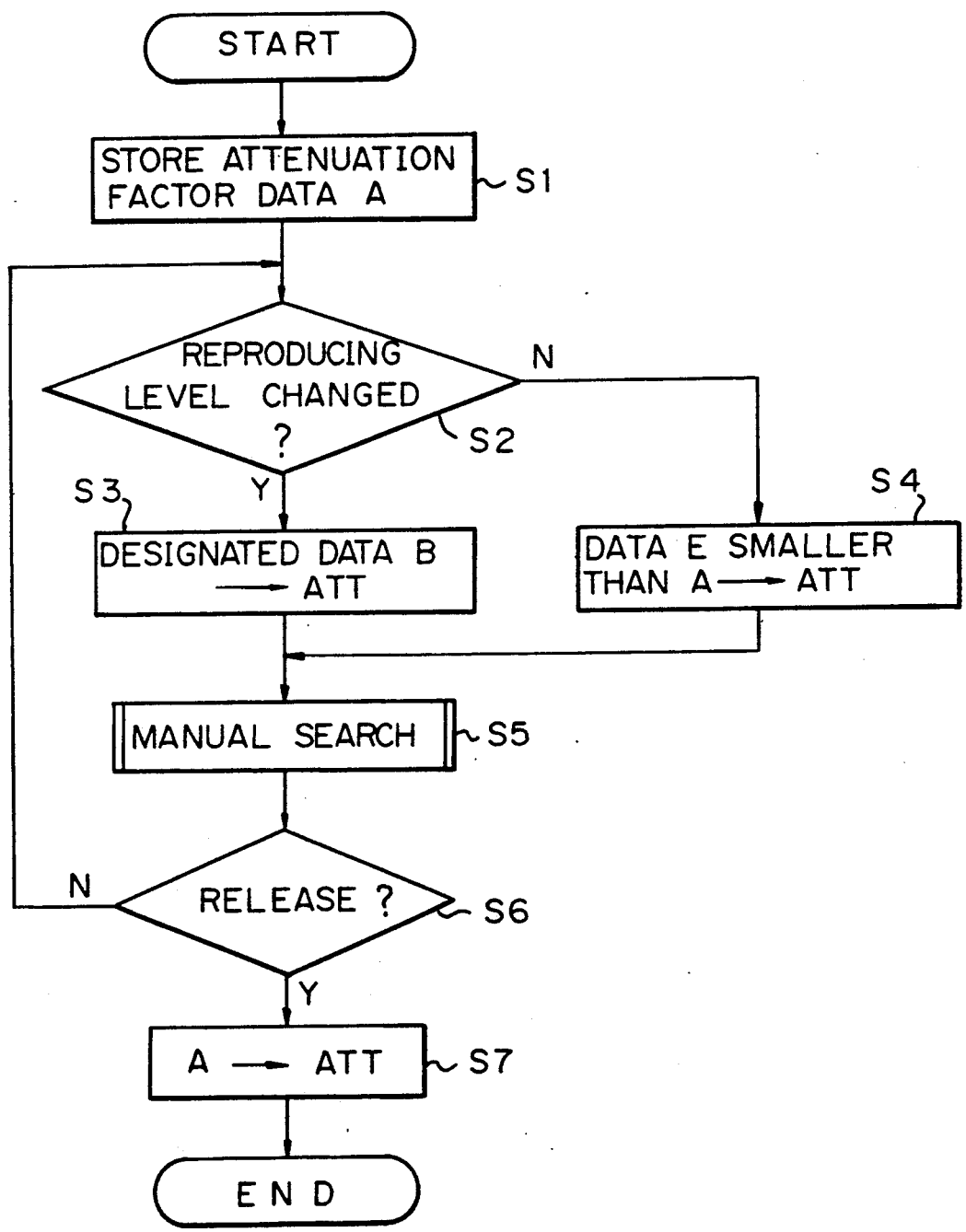

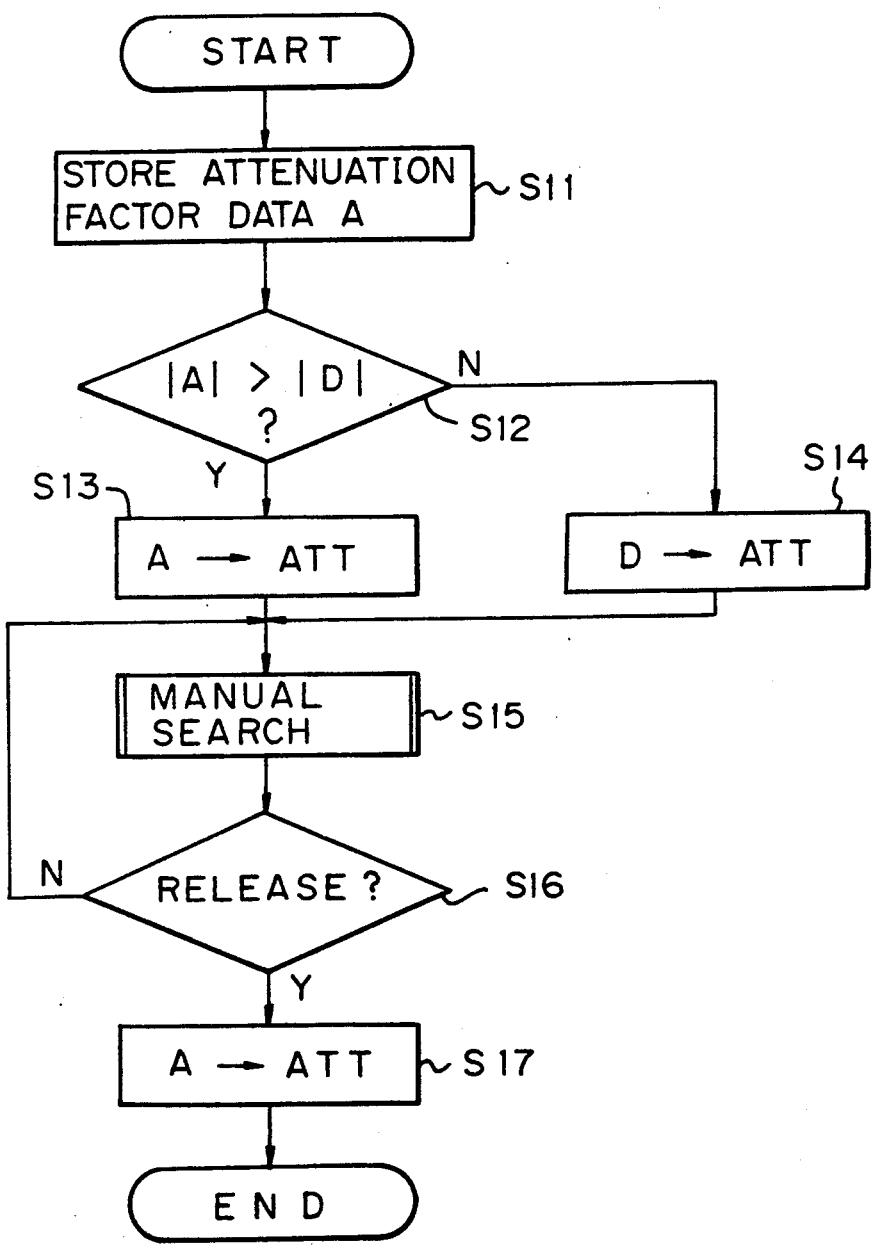

DISC PLAYER WITH MANUAL SEARCH FUNCTION

BACKGROUND OF THE INVENTION

1. Field of the Invention

The present invention relates to a disc player for playing a disc such as a digital audio disc, video disc, or the like, which is provided with a manual search function for music selection.

2. Description of the Related Art

In general, a disc player can perform in a manual search mode in which the playing operation and jumping operation are alternately executed as long as a manual search command is generated by manual switch operation whereby a user can search for a desired program in a disc mounted therein. Each playing operation during the manual search continues for a short period, for instance, about a few seconds. The reproducing level during each playing operation during the manual search is set at such a reduced level that the content of a program can only be approximately discriminated since the sound quality is not always good during such operation.

In the conventional disc player, the reproduced sound level is reduced during the manual search mode to a level lower than, and is determined from, the reproduced sound level present when the manual search command is manually initiated by means of, for example, a keyboard.

However, it has been a problem that the reproduced sound level during the manual search mode becomes too low to listen to the reproduced sound, when the reproduced sound level is relatively low upon the initiation of the manual, search command.

SUMMARY OF THE INVENTION

It is an object of the present provide a disc player in which the reproducing level thereof during manual search can be adjusted to a level to distinguish the content of the sound information represented by the reproduced sound.

According to the present invention, so long as a change command is not generated during the manual search operating mode to alternately execute the playing operation and jumping operation, the reproducing level in the manual search operating mode is set to a level lower than the reproducing level at the initiation of the manual search command, and when the change command is generated, the reproducing level in the manual search operating mode is changed to a designated level.

According to an additional feature of the present invention, the reproducing level at the initiation of the manual search command and a predetermined level are compared with each other and the reproducing level in the manual search operating mode may be set to a level which is equal to the smaller one of the particular reproducing level and the predetermined level.

BRIEF DESCRIPTION OF THE DRAWINGS

FIG. 2 is a flowchart showing an example of the operation of a processor in the apparatus of FIG. 1; and FIG. 3 is a flowchart showing another example of the operation of the processor in the apparatus of FIG. 1.

DETAILED DESCRIPTION OF A PREFERRED EMBODIMENT

Figure 1:
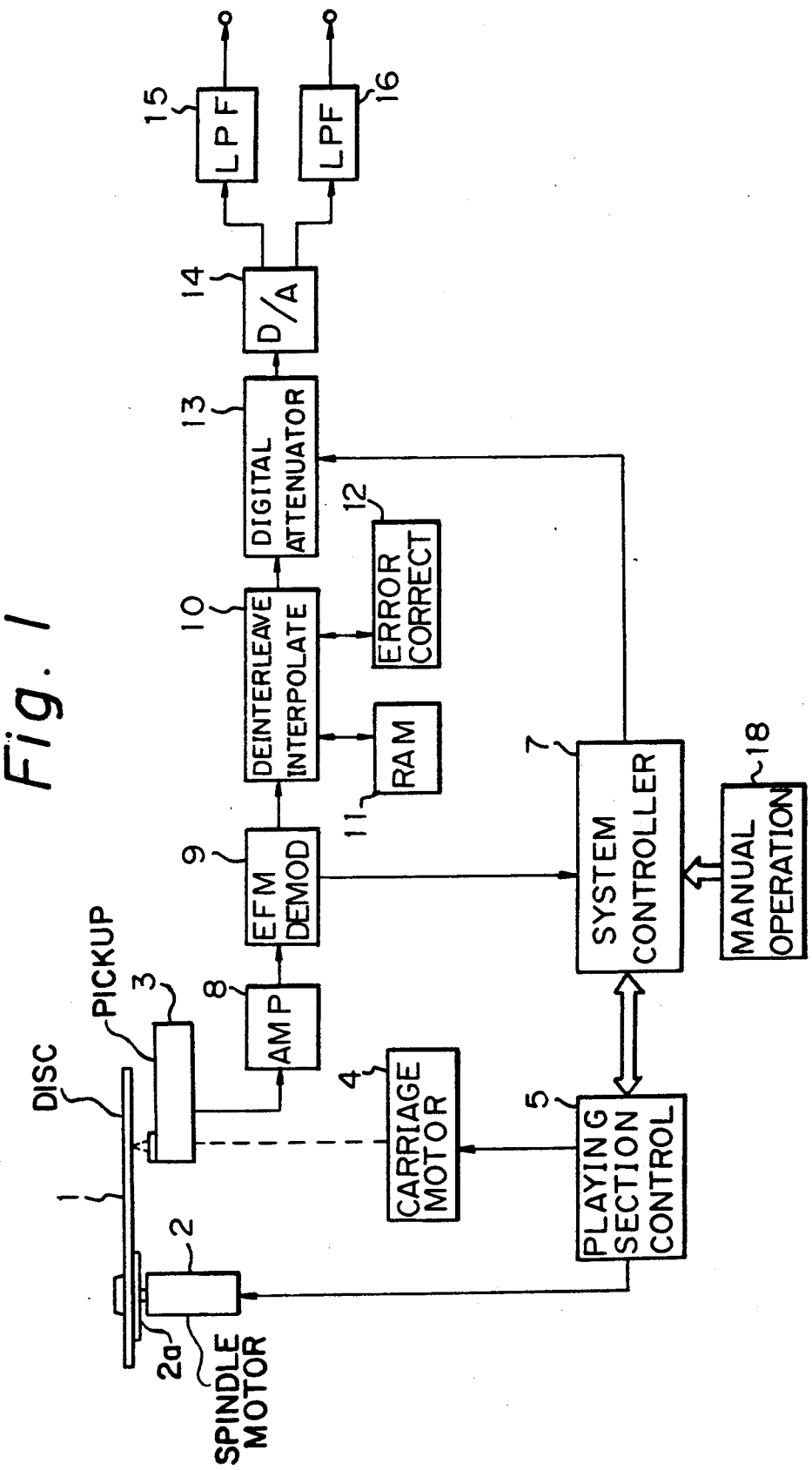
FIG. 1 is a block diagram showing an embodiment of the present invention.

An embodiment of the present invention will be described in detail hereinbelow with reference to the drawings.

In. FIG. 1, a CD player is shown in which a disc (called CD) 1 on which a plurality of programs have been recorded is rotated by a turntable 2a driven by a spindle motor 2. The signal recorded on the disc 1 is read by a pickup 3 in association with the rotation of the disc 1. The pickup 3 is supported by a carriage (not shown) which is moved in the radial direction of the disc 1 by a carriage motor 4. An information reading point, for example, a light spot to read information, of the pickup 3 is freely positioned in the radial direction of the disc 1. In addition, although various servo systems such as a spindle servo system, focusing servo system, tracking servo system, carriage servo system, and the like are provided, since they are already well known, they are not shown in the drawings.

The spindle motor 2 and carriage motor 4 are controlled by a playing section control circuit 5 as well as the spindle servo system and carriage servo system (not shown). In accordance with commands from a system controller 7, the control circuit 5 drives the spindle motor 2 and carriage motor 4 and executes on/off control of the various servo systems in known manners.

A so-called an RF (radio frequency) signal which is output from the pickup 3 is amplified by an RF amplifier 8 and, thereafter, it is supplied to an EFM demodulator 9. The EFM demodulator 9 demodulates pulse signals which are obtained by slicing the RF signal and forms PCM data, that is, digital data including a main code representing time-division multiplexed audio signals of both of the right and left channels and also a subcode. The digital data including the audio information signal which is issued from the EFM demodulator 9 is supplied to a deinterleave interpolation circuit 10. The deinterleave interpolating circuit 10 deinterleaves the digital data whose order is rearranged in accordance with the original interleave which has been executed before recording on the disc in cooperation with an RAM 11 and also transmits the digital data to an error correcting circuit 12. When a signal indicating that the digital data is uncorrectable is output from the error correcting circuit 12, the circuit 10 interpolates the erroneous data in the output data of the error correcting circuit 12 by a mean value interpolating method or the like. On the other hand, the error correcting circuit 12 executes error correction by using a CIRC (Cross Interleave Reed Solomon Code) and supplies the digital data to the deinterleave interpolating circuit 10. If the erroneous data cannot be corrected, a signal indicative of the uncorrectable stage is output.

The output data of the deinterleave interpolating circuit 10 is supplied to a digital attenuator 13. The attenuator 13 attenuates the input data by using a divider and the like by only the value corresponding to the attenuation factor indicated by data which is output from the system controller 7. Output data of the digital attenuator 13 is supplied to a D/A (digital/analog) converter 14. The D/A converter 14 has a demultiplexer for separating every channel of the digital data including the time-shared multiplexed audio information of the right and left channels. The audio signals of both of the right and left channels are reproduced. Unnecessary components are eliminated from the reproduced audio signals of both the right and left channels by LPFs (low pass filters) 15 and 16. Thereafter, the audio signals are supplied to audio output terminals.

On the other hand, the subcode which was output from the EFM demodulator 9 is supplied to the system controller 7. The system controller 7 includes a microcomputer comprising, for instance, a processor, a ROM, a RAM, a timer, and the like. In response to a command corresponding to the key operation which is supplied from a manual operating section 18 such as a keyboard, the system controller 7 executes the arithmetic operation on the basis of the data or program stored in the ROM, RAM, etc. and, thereafter, supplies a command signal to play, search, jump, or the like to the playing section control circuit 5 and also supplies the data indicative of the attenuation factor to the digital attenuator 13.

The operation of the processor in the system controller 7 in the above construction will be described with reference to a flowchart of FIG. 2.

If a manual search command is given from the manual operation section when the operating mode has been set into the playing mode during the execution of the main routine, playing mode control routine, or the like, the processing routine of the processor advances to step S1. In step S1, the data A which indicates the attenuation factor corresponding to the reproducing level designated by the key operation of the operating section 18 in the playing mode and which is supplied to the digital attenuator 13 is transferred to and stored into a predetermined address in the RAM by the processor. Next, the processor checks to see if a command to change the reproducing level has been generated by key operation of the operating section 18 (step S2). If NO in step S2, the processor supplies data E which is smaller than the data A stored in the predetermined address in the RAM by only a predetermined value to the digital attenuator 13 as data C indicative of the attenuation factor (step S4). If the command to change the reproducing level is determined to have been generated in step S2, the processor supplies the digital attenuator 13 with data C indicative of the attenuation factor corresponding to data B representative of a reproduction level which has been newly designated by manual key operation to the digital attenuator 13 (step S3).

After completion of the execution in step S3 or S4, the processor accesses and executes a subroutine for performing the manual searching operation in which the jump command and play command are alternately supplied to the playing section control circuit 5 (step S5). A check is then made to see if a release command has been generated by key operation of the operating section 18 (step S6). If the release command has been generated in step S6, the processor transmits the data A stored in the predetermined address in the RAM to the digital attenuator 13 as the data C (step S7). The execution of the routine which was executed just before the processing routine advanced to step S1 is restarted.

So long as the command to change the reproducing level is not generated during the manual searching mode in steps S2 and S4 in the above operation, the attenuation factor of the digital attenuator 13 is set so that reproduced sound is lower than that determined in the operating mode at the initiation of the manual search command. On the other hand, if a command to change the reproducing level has been generated during the manual searching mode in steps S2 and S3, the attenuation factor of the digital attenuator 13 is set to the value corresponding to the reproducing level which was manually newly designated via the operation section 18. Therefore, during the manual searching mode, if the reproducing level too much decreased to listen to the reproduced sound, the user can set the reproducing level into a desired level while listening to the reproduced sound.

FIG. 3 is a flowchart showing another example of the operation of the processor in the system controller 7 in the apparatus of FIG. 1. Since steps S15 to S17 in the flowchart of FIG. 3 are substantially similar to steps S5 to S7 in the flowchart of FIG. 2, only the operations at steps S11 to S14 will now be described hereinbelow.

If the manual search command is generated when the operating mode has been set into the playing mode by the execution of a main routine, playing mode control routine, or the like, the processing routine of the processor advances to step S11. In step S11, the data A which indicates the attenuation factor corresponding to the reproducing level designated by the key operation of the operating section 18 in the playing mode and which is supplied to the digital attenuator 13, is transferred to or stored into a predetermined address in the RAM. Next, the processor compares the attenuation factor A with predetermined data D and moves to step S14 if relatively little attenuation A is in effect. If attenuation is expressed in the decibel system, for example, the absolute value |A| of the data A may be compared with the absolute value |D| of predetermined data D which has previously been stored in a predetermined address in the ROM, thereby determining whether |A| is larger than |D| or not (step S12). If NO in step S12, that is, |A| is not larger than |D|, the processor supplies the data D to the digital attenuator 13 as the data C indicative of the attenuation factor (step S14). Then, step S15 follows. To the contrary, if YES in step S12, namely, |A| is larger than |D|, the processor supplies the data A as data C to the digital attenuator 13 (step S13). Then, step S15 follows.

When it is assumed that the value of the data D which has previously been stored in the predetermined address of the ROM is −12 dB and that the actual reproducing level in the operating mode at the initiation of the manual searching command is −6 dB, the value of |−12| is larger than the value |−6|, so that the reproducing level in the manual searching mode is set to −12 dB by the operation performed by the steps S12 to S14. If, on the other hand, the reproducing level in the operating mode at the initiation of the manual search command is −20 dB, the value |−12| is smaller than the value |−20|, and the reproducing level in the manual searching mode is set to −20 dB.

As mentioned above, the reproducing level in the manual searching mode is equalized to the smaller one of the reproducing level in the operating mode at the initiation of the manual searching command or mode and the desired or predetermined reproducing level. Therefore, if the reproducing level in the operating mode at the initial phase of the manual searching mode is larger than the predetermined reproducing level, the reproducing level in the manual searching mode can be set to a predetermined small value. If, moreover, the reproducing level in the operating mode at the initial phase of the manual searching mode is smaller than the predetermined reproducing level, the reproducing level in the manual searching mode is kept the same as the reproducing level in the operating mode at the initial phase of the manual searching mode. Consequently, it is possible to prevent a situation such that the reproducing level in the manual searching mode decreases to too low a level to listen to the reproduced sound.

As described in detail above, in the disc player according to the invention, so long as the command to change the reproducing level is not generated in the manual searching mode, the reproducing level in the manual searching mode is set to a level smaller than the reproducing level in the operating mode at the initiation of the manual searching mode or command. If the change command is generated, the reproducing level in the manual searching mode is changed to the designated level. Therefore, when the manual searching mode is set, and the reproducing level is too low to listen to the reproduced sound, the user can set the reproducing level to a desired level while listening to the reproduced sound. Thus, the reproducing level in the manual searching mode can be preferably set.

According to another feature of the present invention, the reproducing level in the operating mode at the initiation of the manual searching command or mode is compared with a predetermined level and the reproducing level in the manual searching mode is equalized to the smaller one of the reproducing level at the initiation of the manual searching mode and the predetermined level. If, therefore the reproducing level at the initiation of the manual searching mode is larger than the predetermined level, the reproducing level in the manual searching mode can be set to the predetermined small value. Further, if the reproducing level at the initiation of the manual searching mode is smaller than the predetermined level, the reproducing level in the manual searching mode is set to the same value as the reproducing level in the operating mode at the initiation of the manual searching mode. Thus, decreasing the reproducing level during the manual searching mode too much is avoided.

What is claimed is:

1. A disc player comprising:
   means for alternately performing play and jump operations in response to a manual search command, and
   sound level adjust means for adjusting a reproducing level of said disc player, wherein said sound level adjust means includes a first means for maintaining said reproducing level at a level lower than a reproducing level at an initiation of said manual search command as long as a change command is not received by said disc player, and a second means for changing a reproducing level established by said first means to a designated level in response to said change command.

2. A disc player comprising:
   means for alternately performing play and jump operations in response to a manual search command, and
   sound level adjust means for adjusting a reproducing level of said disc player, wherein said sound level adjust means includes means for comparing a predetermined level with a reproducing level at an initiation of said manual search command and means for adjusting a reproducing level to a level which is equal to the lower one of said predetermined level and said reproducing level at said initiation of said manual search command.

3. A method of adjusting a sound output level of a disc player, comprising the steps of:
   (a) receiving a manual search command in said disc player;
   (b) storing first data indicative of a current sound level in a memory;
   (c) if a sound level change command has not been received by said disk player, utilizing a high attenuation factor to generate sound from said disk player during a manual searching operation;
   (d) if said sound level change command has been received by said disc player, utilizing a designated attenuation factor to generate sound form said disc player during said manual searching operation, said designated attenuation factor being designated by an operator;
   (e) when a release signal is received by said disc player, stopping said manual searching operation; and
   (f) transmitting sound form said disc player at a sound level indicated by said first data.

4. A method of adjusting a sound output level of a disc player, comprising the steps of:
   (a) receiving a manual search command in said disc player;
   (b) storing first data indicative of a current sound level in a memory;
   (c) if a first attenuation factor, indicative of said current sound level, is not greater than a predetermined attenuation factor to generate sound from said disc player during a manual searching operation;
   (d) if said first attenuation factor is greater than said predetermined attenuation factor, utilizing said first attenuation factor to generate sound from said disc player during said manual searching operation;
   (e) when a release signal is received said disc player, stopping said manual searching operation; and
   (f) transmitting sound from said disc player at a sound level indicated by said first data.

5. A method of adjusting a sound output level of a disc player as set forth in claim 4 above, wherein said first attenuation factor and said predetermined attenuation factor are represented in decibel representation and wherein steps (c) and (d) include comparing absolute values of decibel representations.

* * * * *